(12) United States Patent
Di Litta et al.

(10) Patent No.: US 9,400,992 B2
(45) Date of Patent: Jul. 26, 2016

(54) POPULATING A SOFTWARE CATALOGUE WITH RELATED PRODUCT INFORMATION

(75) Inventors: Luca Di Litta, Rome (IT); Scot MacLellan, Rome (IT); Luigi Pichetti, Rome (IT); Marco Secchi, Rome (IT); Antonio Secomandi, Brugherio Milan (IT)

(73) Assignee: International Business Machines Corporation, Armonk, NY (US)

( * ) Notice: Subject to any disclaimer, the term of this patent is extended or adjusted under 35 U.S.C. 154(b) by 2610 days.

(21) Appl. No.: 12/062,093

(22) Filed: Apr. 3, 2008

(65) Prior Publication Data

US 2008/0250038 A1 Oct. 9, 2008

(30) Foreign Application Priority Data

Apr. 3, 2007 (EP) ..................................... 07105562

(51) Int. Cl.
 *G06F 17/30* (2006.01)
 *G06Q 30/06* (2012.01)
 *G06F 9/44* (2006.01)

(52) U.S. Cl.
 CPC .............. *G06Q 30/0603* (2013.01); *G06F 8/71* (2013.01)

(58) Field of Classification Search
 None
 See application file for complete search history.

(56) References Cited

U.S. PATENT DOCUMENTS

| | | | | |
|---|---|---|---|---|
| 6,021,491 | A * | 2/2000 | Renaud | 713/179 |
| 6,151,643 | A * | 11/2000 | Cheng et al. | 710/36 |
| 6,381,742 | B2 * | 4/2002 | Forbes et al. | 717/176 |
| 6,675,382 | B1 * | 1/2004 | Foster | 717/177 |
| 7,512,590 | B2 * | 3/2009 | Boykin et al. | |
| 7,548,938 | B2 * | 6/2009 | Minami | |
| 7,685,183 | B2 * | 3/2010 | Pace | G06F 8/60 707/610 |
| 7,739,691 | B2 | 6/2010 | Elvanoglu et al. | |
| 7,860,239 | B2 * | 12/2010 | Cerri et al. | 380/26 |
| 7,934,210 | B1 * | 4/2011 | Stampfli | G06F 8/61 709/220 |
| 7,953,980 | B2 | 5/2011 | Schluessler et al. | |
| 8,307,355 | B2 * | 11/2012 | Capomassi et al. | 717/170 |

(Continued)

FOREIGN PATENT DOCUMENTS

| | | |
|---|---|---|
| EP | 376345 | 1/2004 |
| EP | 746501 | 1/2004 |

(Continued)

OTHER PUBLICATIONS

Constantine Sapuntzakis, et al; "Virtual Appliances for Deploying and Maintaining Software"; Lisa 2003 Paper. http://www.usenix.org/events/lisa03/tech/fun papers/sapuntzakis/sapnntzak is html.*

(Continued)

*Primary Examiner* — Polina Peach
(74) *Attorney, Agent, or Firm* — Yee & Associates, P.C.; Gail M. Earick (57) ABSTRACT

A method and system for populating a software catalogue in software applications which monitor the presence of software products on a plurality of computers. The proposed method aims at populating a software catalogue with a limited manual intervention of an administrator. The present invention reduces the cost of producing and maintaining a comprehensive knowledge base (the catalogue) which contains definitions of software products and the related signature. Information about software products and their related signature is obtained through a process using some special files (e.g. XML files) which contains information and/or pointers to other products.

14 Claims, 4 Drawing Sheets

(56) References Cited

U.S. PATENT DOCUMENTS

| | | | |
|---|---|---|---|
| 2003/0182652 A1* | 9/2003 | Custodio | G06F 8/61 717/122 |
| 2004/0034850 A1* | 2/2004 | Burkhardt et al. | 717/120 |
| 2004/0054987 A1* | 3/2004 | Sonpar | G06F 8/71 717/120 |
| 2004/0177039 A1* | 9/2004 | Pincus et al. | 705/40 |
| 2005/0125621 A1* | 6/2005 | Shah | G06F 17/30595 711/173 |
| 2006/0080656 A1* | 4/2006 | Cain | G06F 8/65 717/174 |
| 2006/0242164 A1* | 10/2006 | Evans | G06F 17/301 |
| 2006/0248467 A1* | 11/2006 | Elvanoglu et al. | 715/744 |
| 2007/0005992 A1* | 1/2007 | Schluessler et al. | 713/193 |
| 2007/0022023 A1 | 1/2007 | Capomassi et al. | |
| 2007/0150587 A1* | 6/2007 | D'Alo et al. | 709/224 |
| 2007/0169079 A1* | 7/2007 | Keller | G06F 8/65 717/168 |

FOREIGN PATENT DOCUMENTS

| | | |
|---|---|---|
| EP | 1376345 A2 | 1/2004 |
| EP | 1521172 A2 | 4/2005 |
| EP | 521172 | 4/2006 |
| EP | 1746501 A1 | 1/2007 |
| KR | 20040002739 A | 1/2004 |
| WO | WO 0205184 A2 * | 1/2002 |

OTHER PUBLICATIONS

FR920070005KR First Office Action dated Mar. 25, 2011 with English Abstract.
FR920070005EP2 First Office Action dated Jan. 21, 2010.
FR920070005PCT Search Report dated Aug. 20, 2008.
Chinese Office Action dated Mar. 2, 2012 regarding application 200880010831.X, with English translation, 6 Pages.

* cited by examiner

POPULATING A SOFTWARE CATALOGUE WITH RELATED PRODUCT INFORMATION

FIELD OF THE INVENTION

The present invention relates to the data processing field. More specifically, the present invention relates to methods and systems for detecting the presence of software products on distributed data processing system. In particular the activity of knowledge gathering and catalogue population is addressed by the present invention. The invention further relates to a computer program for performing the method, and to a product embodying the program. Moreover, the invention also relates to a corresponding apparatus.

BACKGROUND ART

Software applications that operate in the System Management field, base their function on a predefined set of information. This is for example the case with Software Inventory products, e.g. IBM Tivoli Configuration Manager (ITCM) of International Business Machines Corporation, which need to correlate the existence of a certain file on the file system with a certain product. This correlation information is stored within the application repository. Another example comes from license management products, e.g. IBM Tivoli License Manager (ITLM) of International Business Machines Corporation, where information about the actual program execution (myProgram.exe) needs to be correlated to predefined product.

Another example is the Application Monitoring discipline, where the management system is used to monitor the state of applications running on servers. In this case the management system needs to know each of the monitored application interface one by one as each application has it's own method to check application status and its own method to start and stop executions.

The setup and maintenance of this predefined set of information when dealing with large scale environments can act as a limiting factor for the affected System Management applications.

This information needs to be collected from Software Development teams that develop the Applications that are subject to Management Discipline. Then the information needs to be managed and stored into databases normally known as Knowledge Base. Finally the information needs to be extracted from the KB into a format that is consumable by the System Management Application.

Normally this knowledge base is in the form of a catalogue which contains definitions of software products (e.g. product names and version) and the related signature. The software catalogue lists all the known products which can be found on the managed systems; each product can be identified by one or more executable modules indicative of its running. As an example, in the case of a License Manager product, a licensing agent working in the background detects the executable modules that have been launched; the licensing agent then identifies the corresponding products through the software catalogue. The catalogue needs to be "populated" and this is normally a costly activity.

Several IT management solutions exist that perform the discovery of installed software for either inventory or licensing purposes. One form of software discovery that is particularly effective exploits a previously defined signature for each product that has to be discovered. The term signature means any type of information that can be consumed by a software discovery application to determine the presence of one or more instances of a software product on a given computer. A typical and particularly simple implementation of a signature is one that specifies the file-name and the file-size of a key application file. In this case, detecting a file with matching characteristics would cause the signature to be matched, thus indicating that the associated software product is installed. One advantage of a signature-based approach to software discovery is that the matching of a signature can be correlated by a management application to a precise definition (name, version, etc.) of the entity (software product) being discovered. A software inventory application which exploits signature-based discovery of installed software therefore has the need of accessing a comprehensive knowledge base of product and signature definitions. The challenge of this approach is to maintain its content up-to-date with respect to:

new software products being continuously made available;
maintenance updates to existing software products.

The value of the Knowledge Base is directly proportional to the coverage and accuracy of its content, therefore the problem is how to guarantee coverage and accuracy at an affordable cost.

It would therefore be highly desirable an improved method which could help reducing the Knowledge Base management overhead while introducing a scalable and efficient method to deal with the information that are needed at runtime.

It is an object of the present invention to provide a method and a system which alleviates the above drawbacks.

SUMMARY OF THE INVENTION

According to the present invention we provide a method of populating a software catalogue with software product identifiers corresponding to software products being discovered on a plurality of data processing systems, the method including the steps of: scanning the file systems of the plurality of data processing system for detecting the occurrence of a set of files indicative of a product being installed on a data processing system, the set of files including at least one manifest file containing information on at least one referenced software product; determining a product signature associated to the referenced product using the information of the manifest file; storing the signature and an associated software product identifier on the software catalogue.

Another aspect of the present invention provides a computer program for performing the above-described method.

A still further aspect of the invention provides a program product embodying this program.

Moreover, another aspect of the invention provides a corresponding apparatus for implementing the above method.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
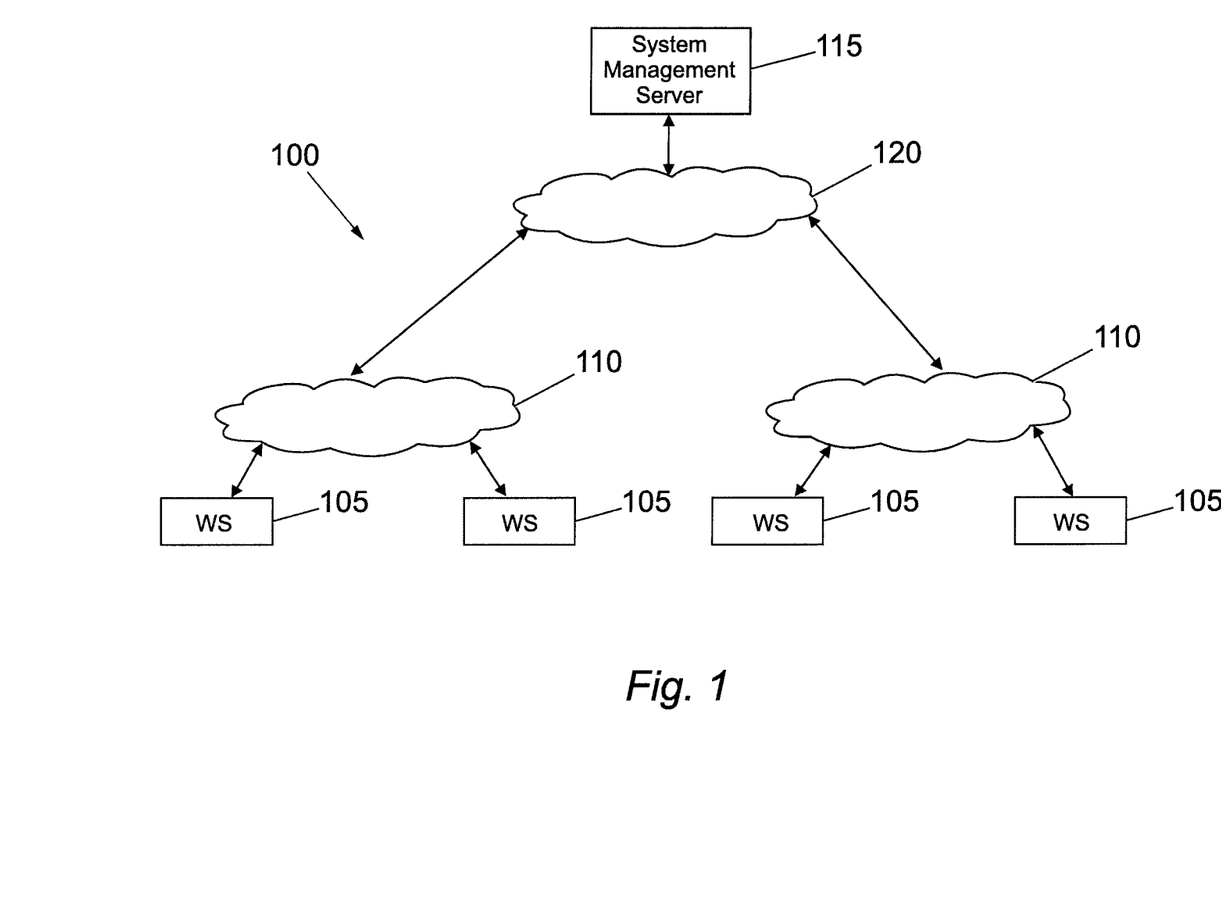
FIG. 1 is a schematic block diagram of a data processing system in which the method of the invention is applicable.

With reference in particular to FIG. 1, a data processing system 100 with distributed architecture implementing a Software Inventory system, is depicted. The system 100 includes multiple endpoints 105, which are grouped into different sets. The endpoints 105 can be workstations, servers, laptops and more generally any kind of data processing system where a plurality of software products is installed. The endpoints 105 are connected to each other through a network 110 (for example, a LAN). The different sets of endpoints 105 communicate with a remote system management server 115 through a network 120 (for example, INTERNET-based); the system management server 115 implements a central repository where inventory data of the system 100 is collected and managed. As mentioned above, the present invention may be implemented in a license management system, but more generally in any system requiring an inventory activity, e.g. a software deployment system which needs to distribute fixes or enhancements to a plurality of workstation, after having inventoried the current status of each workstation; another possible use is within a configuration management system.

Figure 2:
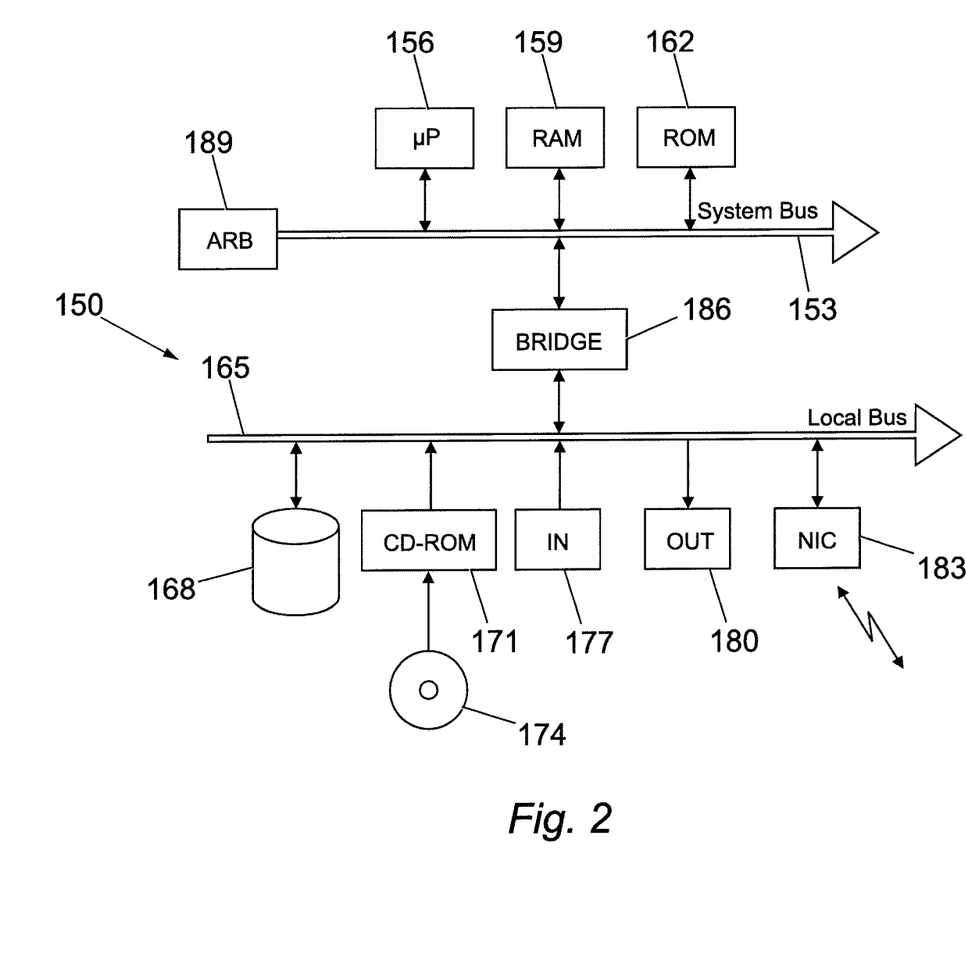
FIG. 2 shows the functional blocks of a generic computer of the system.

As shown in FIG. 2, a generic computer of the system (workstation, local server, or system management server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized, or even in a stand-alone computer.

Figure 3:
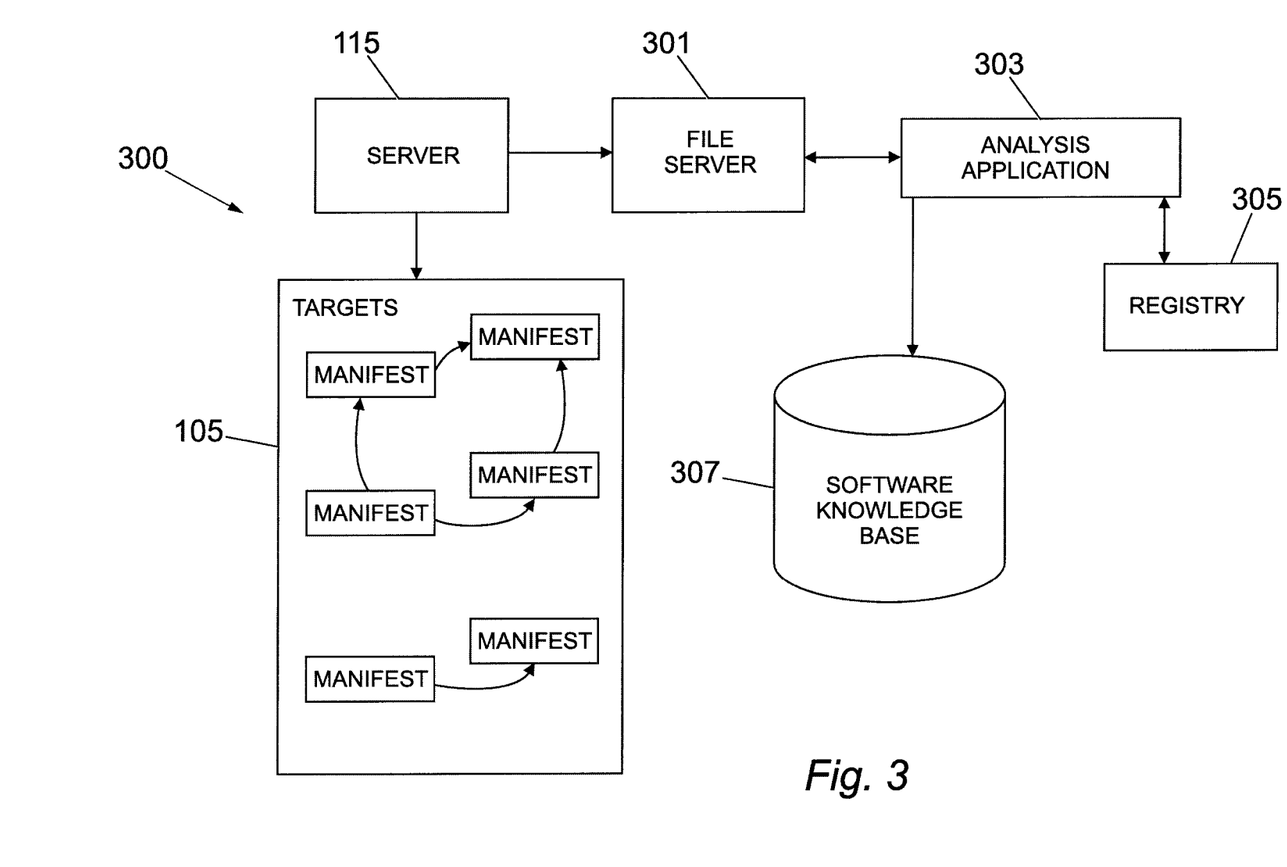
FIG. 3 depicts the main components that can be used for practicing the method.

Considering now FIG. 3, the main components that can be used to practice the method of a preferred embodiment of the invention are denoted as a whole with 300. The information (programs and data) is typically stored on the hard-disks of the different computers and loaded (at least partially) into the corresponding working memories when the programs are running.

A System Management Server 115 controls and executes management operations on several endpoints 105, connected by a communication network. The set of endpoints 105 includes servers, workstations, desktops or laptops, whose installed software is analyzed with the objective of enlarging the available base of product definitions and related signatures and discover software products.

The Systems Management Server 115 controls management operations on a potentially large set of interconnected endpoints 105, thus avoiding the need of physically visiting each computer. This server and the underlying systems management infrastructure are used for performing a scanning operation on the managed computers with the goal of collecting raw data needed by the analysis application; and for moving data generated locally by the scanners to a central file-server 301, where these data can be stored on the server's file system. The scanning operation may be performed on all managed endpoints 105 or on a specific subset, the latter being possibly determined by their role (servers, workstations, desktops or laptops) or by the running operating system.

According to a preferred embodiment of the present invention, the above data gathering method is implemented by using IBM Software Signature Analyzer Tool; it is however understood by those skilled in the art that other methods, producing similar results could be used instead. The method includes a mechanism which helps in increasing the knowledge of the overall system without causing big overhead to the system itself. The present method is based on the concept that the Managed Application (the application that is managed by the System Management Application) manifest it's management interfaces using an Application Management Manifest file. Block 105 of FIG. 3 represents in general the plurality of targets 105, however in the Figure only a number of Manifest files are represented to show their relations and possible cross references.

The System Management Application will detect the Manifest file at Runtime on the systems where the Managed Application is installed and extract the information which are included in the Manifest file. A Manifest file can point to another (or more than one) Manifest file which in turn could point to one or more Manifest files Manifest file, can take the form of an XML document, which includes a set of well-known tags, like product name, vendor name, version details, i18n info but also control commands (start/stop interfaces), lifecycle information (url where to download a more recent version of the product, etc).

Here is an example of a Manifest file:

```
<ProductManifest>
  <ID>
    <ProductName>IBM Tivoli License Compliance Manager</ProductName>
    <Version>2</Version>
    <Release>3</Release>
    <Modification>1</Modification>
    <Fixpack>1</Fixpack>
    <VendorName>IBM</VendorName>
    <VendorHome>Program Files\IBM</VendorHome>
    <ProductId>1</ProductId>
  </ID>
  <Monitor>
    <SignatureExeFile>
      <FileName>TLM.exe</FileName>
      <FileSize>15000</FileSize>
    </SignatureExeFile>
  </Monitor>
  <LifeCycle>
    <DownloadURL>www.ibm.com/support/ITLCM</DownloadURL>
  </LifeCycle>
  <ManagentCommand>
    <StartCommad>srvstart</StartCommad>
    <StopCommand>srvstop</StopCommand>
    <MonitorCommad>srvcheck</MonitorCommad>
  </ManagentCommand>
  <RelatedProducts>
    <product>
```

-continued

```
<ProductId>IBM WebSphere Application Server</ProductId>
<ProductLocation>Program
Files\IBM\WebSphere\</ProductLocation>
    </product>
  </RelatedProducts>
  <SameVendor>
    <ProductId>Program Files\IBM\HTTP
Server\ProductManifest.xml</ProductId>
    <ProductId>Program
Files\IBM\DB2\ProductManifest.xml</ProductId>
  </SameVendor>
</ProductManifest>
```

The Manifest file can be in addition used to provide a ranking support for customers that have to make selections in ambiguous situations.

Manifest file can reference also other product Manifest files which are related in some way to the current product, in such case the agents can select from the aggregated catalog also the information of the related products. For example a product manifest file could contain reference to the manifest file of other products delivered from the same vendor.

In this way, according to the example above, the ITLM product is able to detect the existence of the referenced application and update the software catalogue (the Knowledge Base) during standard application operation. The Information needed for the discovery are on the machine, hence avoiding unnecessary correlation duties.

Further the application management manifest can contain information about which file must be in execution on to the operating system to consider that the managed application is running, which command the Management application can issue to start or stop the managed application.

The present invention aims at populating the Knowledge Base 307 using the gathered information. In this way the Knowledge Base is broadened exploiting the normal activity of the Software Application. With the present method a more efficient update of the Knowledge Base can be performed without the need of a specific process or manual procedure by leveraging the references which are included in the Manifest files to other related applications and Manifest Files. The data harvested from the selected computers stored in the file-system of the central file-server, from which the data can be accessed by the Analysis Application 303. Analysis Application 303 implements the data transformation and the analysis leading to the creation of new product definitions and related signatures.

The Analysis Application 303 combines the data gathered as explained above with registry information contained in Operating System Registry 305. This combined product definition and a related signature is then generated and stored in the Software Knowledge Base 307. A Software Knowledge Base 307 is a database holding a set of consolidated product definitions and signatures. The database can be initially empty or it can be populated with data created by a provider of software signatures. The new definitions produced by the analysis application are consolidated in this database.

Figure 4:
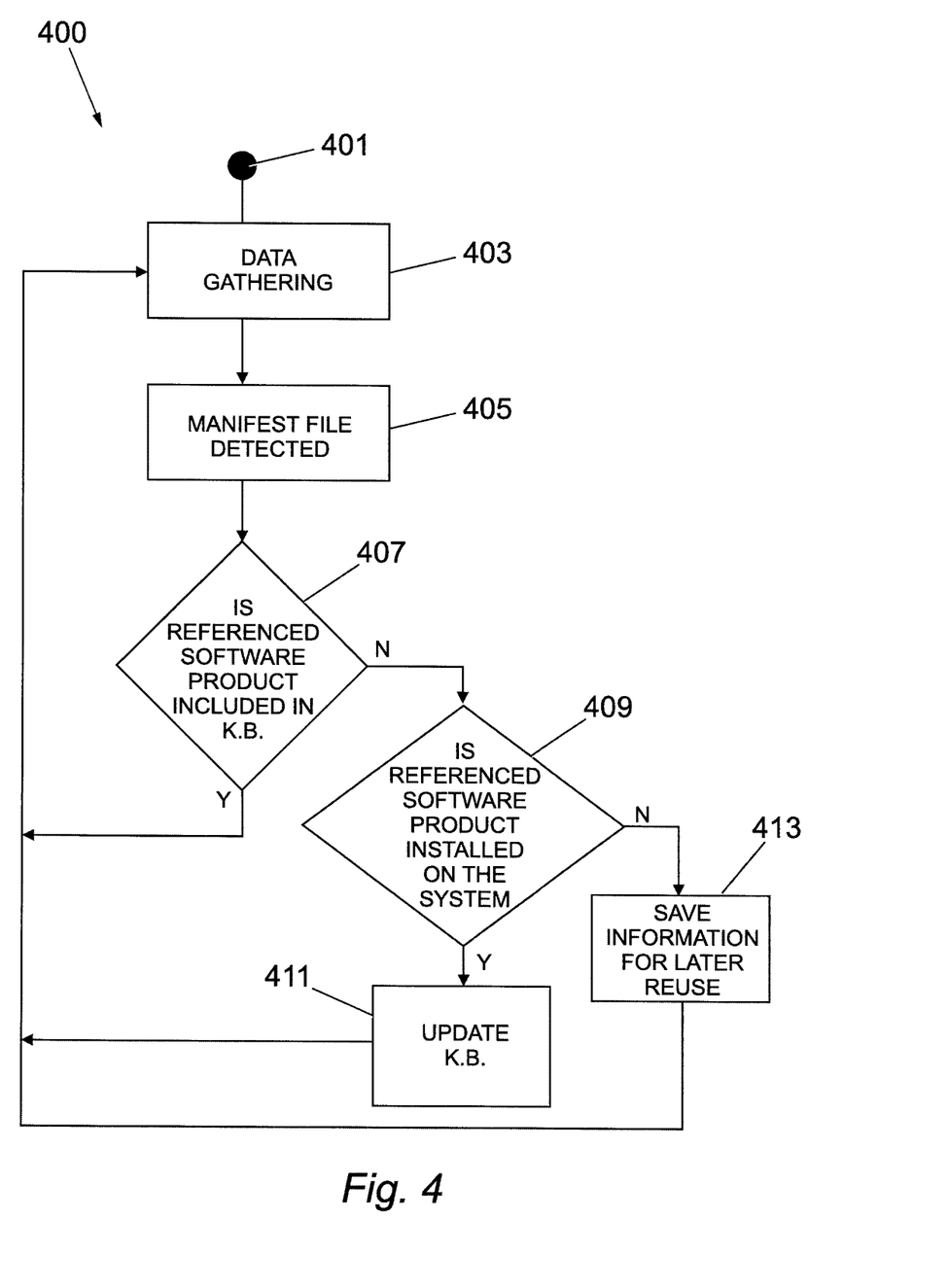
FIG. 4 shows a diagram describing the flow of activities relating to an illustrative implementation of the method.

Considering now FIG. 4, the logic flow of generating a product signature according to an embodiment of the invention is represented with a method 400. The method begins at the black start circle 401. Continuing to block 403 data are gathered throughout the endpoints 105. At step 405 Manifest files are detected during normal operations by means of existing discovery procedures, e.g. well known Operating System registry keys pointing to an existing Manifest file or file system scan looking for predetermined Manifest file name matching criteria. As explained above Manifest files contains information about the detected software product and/or reference to another software product which can be related in some way to the detected software product. A Manifest file could be also detected as a consequence of a cross-reference from another Manifest file (as mentioned above with reference to FIG. 3). At step 407 it is checked whether the referenced software product is already known to the system, i.e., according to a preferred embodiment of the present invention, if an entry relating to such referenced software product is found in the Knowledge Base 307. If the software product is already listed, no further action is needed and the control goes back to step 403. As an alternative embodiment it would be possible to verify whether the information contained in the Knowledge Base is complete or whether it can be integrated with the content of the Manifest file. If the result of the check of step 407 is negative, the method takes advantage of the information contained in the Manifest file. According to an embodiment of the present invention a further check (409) is performed to verify the presence of the referenced software product on the monitored systems (e.g. on the plurality of endpoints 105). If this is the case the Knowledge Base 307 is updated with the information provided by the Manifest file (step 411), otherwise it is saved for future use (step 413). A possible alternative is to update the Knowledge Base 307 in any case, so that the check 409 is not necessary. Or also the information contained in the Manifest file could be integrated with other information gathered from the system with traditional methods.

Similar considerations apply if programs and data are structured in a different manner, if other modules or functions are provided, or if the information is stored in equivalent memory structures.

Similar considerations apply if the method includes equivalent or additional steps.

Alternatively, for example different methods of obtaining the information on the inspected endpoints can be used, depending also on the operating system on which the system is installed. It would be possible for example that the Manifest file "manifests" their presence to the System Management application at predetermined times or with pretermined rules.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

In any case, the method of the invention can be used for discovering, inventorying or metering any kind of software products (such as video games, multimedia works, and the like).

In addition, the programs can be distributed on any other computer readable medium (such as one or more DVDs); alternatively, the programs are pre-loaded onto the hard-disks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of populating a software catalogue with software product identifiers corresponding to software products being discovered on a plurality of data processing systems by a system management application, the method including the steps of:
   scanning, during runtime of the plurality of data processing systems, the file systems of the plurality of data processing systems for detecting the occurrence of a set of files indicative of a software product installed on a data processing system, the set of files including at least one manifest file containing management interface information on at least one referenced software product usable by the system management application to control operation of the at least one referenced software product and gathering information from the at least one manifest file and storing the gathered information in a file-system of a central-file server, wherein the at least one manifest file includes a cross-reference to at least one other manifest file of a related software product by including a link to the other manifest file, wherein the other manifest file is detectable as a consequence of the cross-reference;
   determining a product signature associated to the at least one referenced software product using the information of the manifest file;
   responsive to verifying a presence of a given one of the at least one referenced software product on at least one of the plurality of data processing systems, combining and storing the product signature and an associated software product identifier on the software catalogue for each verified referenced software product, wherein the associated software product identifier comprises registry information associated with a given referenced software product that is contained in an operating system registry and the information gathered from the manifest file associated with the verified referenced software product;
   responsive to not verifying a presence of a given one of the at least one referenced software product on at least one of the plurality of data processing systems, saving the information gathered from the manifest file associated with the not verified referenced software product for future use; and
   controlling the at least one referenced software product by the system management application using the management interface information.

2. The method of claim 1, wherein the manifest file includes an XML document.

3. The method of claim 1 wherein the at least one referenced software product includes the software product related to the detected set of files and a different software product that is different from the software product related to the detected set of files.

4. The method of claim 1 wherein the product signature includes a file identifier identifying one of the files of the set of files.

5. The method of claim 1 wherein the association of the product signature with the software product identifier is based on information extracted by the files included in the corresponding set of files.

6. The method of claim 1 wherein software products are inventoried across a plurality of data processing systems.

7. A computer program tangibly stored in a non-transitory computer readable storage device for performing a method of populating a software catalogue with software product identifiers corresponding to software products being discovered on a plurality of data processing systems by a system management application when the computer program is executed on a data processing system, the method including the steps of:
   scanning, during runtime of the plurality of data processing systems, the file systems of the plurality of data processing systems for detecting the occurrence of a set of files indicative of a software product installed on a data processing system, the set of files including at least one manifest file containing management interface information on at least one referenced software product usable by the system management application to control operation of the at least one referenced software product and gathering information from the at least one manifest file and storing the gathered information in a file-system of a central-file server, wherein the at least one manifest file includes a cross-reference to at least one other manifest file of a related software product by including a link to the other manifest file, wherein the other manifest file is detectable as a consequence of the cross-reference;
   determining a product signature associated to the at least one referenced software product using the information of the manifest file;
   responsive to verifying a presence of a given one of the at least one referenced software product on at least one of the plurality of data processing systems, combining and storing the product signature and an associated software product identifier on the software catalogue for each verified referenced software product, wherein the associated software product identifier comprises registry information associated with a given referenced software product that is contained in an operating system registry and the information gathered from the manifest file associated with the verified referenced software product;
   responsive to not verifying a presence of a given one of the at least one referenced software product on at least one of the plurality of data processing systems, saving the information gathered from the manifest file associated with the not verified referenced software product for future use; and
   controlling the at least one referenced software product by the system management application using the management interface information.

8. A system for populating a software catalogue with software product identifiers corresponding to software products being discovered on a plurality of data processing systems by a system management application, comprising:
   a scanner for scanning, during runtime of the plurality of data processing systems, the file systems of the plurality of data processing systems for detecting the occurrence of a set of files indicative of a software product installed on a data processing system, the set of files including at least one manifest file containing management interface information on at least one referenced software product usable by the system management application to control operation of the at least one referenced software product and gathering information from the at least one manifest file and storing the gathered information in a file-system of a central-file server, wherein the at least one manifest file includes a cross-reference to at least one other manifest file of a related software product by including a link to the other manifest file, wherein the other manifest file is detectable as a consequence of the cross-reference;

an analyzer for determining a product signature associated to the at least one referenced software product using the information of the manifest file and combining the product signature and an associated software product identifier to form a combined product signature and associated software product identifier;

a memory for storing, responsive to verifying a presence of a given one of the at least one referenced software product on at least one of the plurality of data processing systems, the combined product signature and associated software product identifier on the software catalogue for each verified referenced software product, wherein the associated software product identifier comprises registry information associated with a given referenced software product that is contained in an operating system registry and the information gathered from the manifest file associated with the verified referenced software product;

responsive to not verifying a presence of a given one of the at least one referenced software product on at least one of the plurality of data processing systems, saving the information gathered from the manifest file associated with the not verified referenced software product for future use; and a controller for controlling the at least one referenced software product by the system management application using the management interface information.

9. The computer program of claim 7, wherein the at least one referenced software product includes the software product related to the detected set of files and a different software product that is different from the software product related to the detected set of files.

10. The computer program of claim 7, wherein the product signature includes a file identifier identifying one of the files of the set of files.

11. The computer program of claim 7, wherein the association of the product signature with the software product identifier is based on information extracted by the files included in the corresponding set of files.

12. The system of claim 8, wherein the at least one referenced software product includes the software product related to the detected set of files and a different software product that is different from the software product related to the detected set of files.

13. The system of claim 8, wherein the product signature includes a file identifier identifying one of the files of the set of files.

14. The system of claim 8, wherein the association of the product signature with the software product identifier is based on information extracted by the files included in the corresponding set of files.

* * * * *